United States Patent
Mitchell et al.

[11] Patent Number: 6,082,464
[45] Date of Patent: Jul. 4, 2000

[54] DUAL STAGE FIRE EXTINGUISHER

[75] Inventors: Robert M. Mitchell, Issaquah; Paul H. Wierenga, Seattle, both of Wash.

[73] Assignee: Primex Technologies, Inc., Redmond, Wash.

[21] Appl. No.: 09/034,711

[22] Filed: Mar. 4, 1998

Related U.S. Application Data

[60] Provisional application No. 60/053,365, Jul. 22, 1997.

[51] Int. Cl.[7] .................................................. A62C 2/00
[52] U.S. Cl. .................... 169/43; 169/45; 169/46; 169/47
[58] Field of Search .................... 169/43, 45, 46, 169/47

[56] References Cited

U.S. PATENT DOCUMENTS

| | | | |
|---|---|---|---|
| 2,015,995 | 10/1935 | Egtvedt | 169/2 |
| 3,356,148 | 12/1967 | Jamison | 169/44 X |
| 3,467,349 | 9/1969 | Gautier | 244/135 |
| 3,584,688 | 6/1971 | Duncan et al. | 169/47 |
| 3,592,270 | 7/1971 | Livingston | 169/16 |
| 3,972,820 | 8/1976 | Filter et al. | 252/2 |
| 4,226,727 | 10/1980 | Tarpley, Jr. et al. | 252/8 |
| 4,276,938 | 7/1981 | Klimenko et al. | 169/47 |
| 4,319,640 | 3/1982 | Brobeil | 169/28 |
| 4,637,472 | 1/1987 | Decima | 169/35 |
| 4,715,448 | 12/1987 | McCulloch | 169/62 |
| 4,836,290 | 6/1989 | Le Lande, Jr. | 169/46 |
| 4,988,884 | 1/1991 | Dunbar et al. | 250/554 |
| 5,124,053 | 6/1992 | Iikubo et al. | 169/47 X |
| 5,239,817 | 8/1993 | Mildenstein et al. | 60/39.091 |
| 5,449,041 | 9/1995 | Galbraith | 169/11 |
| 5,613,562 | 3/1997 | Galbraith et al. | 169/12 |
| 5,626,786 | 5/1997 | Huntington et al. | 252/2 |

OTHER PUBLICATIONS

A. Campbell Ling, Ludwig A. Mayer and Robert L. Altman "Fire Control in Aircraft 1. Comparative Testing of Some Dry Powder Chemical Fire Extinguishants and a New Effective System" appearing in Journal of Fire & Flammability. vol. 13, (Oct. 1982) at p. 215.

*Primary Examiner*—Andres Kashnikow
*Assistant Examiner*—Robin O. Evans
*Attorney, Agent, or Firm*—Wiggin & Dana; Gregory S. Rosenblatt

[57] ABSTRACT

A fire is inerted, extinguished and suppressed, by a dual stage fire extinguisher. In a first stage, a sufficient volume percentage of an inerting agent is delivered to extinguish the fire. Once the fire is extinguished, in the second stage, a different amount of inerting agent is delivered to the fire to suppress it and prevent re-ignition. Since suppression typically requires less of the inerting agent than extinguishing, a reduction in the weight of the inerting media is achieved with the dual stage process making the system particularly amenable to aircraft applications such as in an engine nacelle or cargo dry bay.

15 Claims, 11 Drawing Sheets

DUAL STAGE FIRE EXTINGUISHER

This is a continuation application of provisional application U.S. Ser. No. 60/053,365 filed Jul. 22, 1997.

BACKGROUND OF THE INVENTION

1. Field of the Invention

This invention relates to a method for extinguishing a fire and preventing re-ignition. More particular, a fire extinguishing agent is discharged at a first mass flow rate to extinguish the fire followed by discharge at a second mass flow rate that is effective to prevent re-ignition of the fire.

2. Description of Related Art

Fire involves a chemical reaction between oxygen and a fuel that is raised to its ignition temperature by heat. Fire suppression systems operate by any one or a combination of the following: (i) removing oxygen, (ii) reducing the system temperature, (iii) separating the fuel from oxygen, and (iv) interrupting the chemical reactions of combustion. Typical fire suppression agents include water, carbon dioxide, dry chemicals, perfluorocarbons (PFC's), hydrofluorocarbons (HFC's) and the group of halo-carbons collectively known as halons.

The most efficient fire suppression agents are Halons. Halons are a class of brominated fluorocarbons and are derived from saturated hydrocarbons, such as methane or ethane, with their hydrogen atoms replaced with atoms of the halogen elements bromine, chlorine and/or fluorine. The most widely used Halon is Halon 1301, $CF_3Br$, trifluorobromomethane. Halon 1301 extinguishes a fire in concentrations far below the concentrations required for carbon dioxide or nitrogen gas. Typically, a Halon 1301 concentration above about 3.3% by volume will extinguish a fire.

Halon fire suppression occurs through a combination of effects, including decreasing the available oxygen, isolation of fuel from atmospheric oxygen, cooling and chemical interruption of the combustion reactions. The superior fire suppression efficiency of Halon 1301 is due to its ability to terminate the runaway reaction associated with combustion. The termination step is catalytic for Halon 1301 due to the stability of bromine radicals (Br.) formed when Halon 1301 is disposed on a combustion source.

When unreacted Halon 1301 migrates into the stratosphere, sunlight breaks down the Halon 1301 forming bromine radicals. Br. then reacts to consume ozone in an irreversible manner.

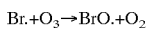

$$Br. + O_3 \rightarrow BrO. + O_2$$

In view of the current recognition that ozone depletion is a serious environmental problem, a move is on to identify: (i) fire suppression agents having a less severe environmental impact than Halon and (ii) devices to deliver these more environmentally friendly agents.

Most agents identified as replacements for Halon 1301 are not as efficient extinguishants. Typically, these replacement agents require between two and three times the volume as compared to Halon 1301. The excess volume creates a retrofit problem when space is at a premium.

In addition to extinguishing the fire, it is necessary to suppress the fire as well. Suppression insures that the fire does not reignite and requires an inerting agent to remain in contact with the location of the extinguished fire for a time sufficient to either (1) reduce the system temperature below the temperature necessary to support combustion, (2) remove the fuel source, or (3) separate the fuel from the oxygen.

A fire suppression apparatus is frequently located in an aircraft engine nacelle, the aerodynamic structure surrounding the engine. An annular region between the engine and the nacelle is fire hazard. During flight, all the requirements of a fire—fuel, oxygen and heat—are present in the nacelle. Some aircraft engine components operate at elevated temperatures, in excess of 700° F., and are capable of igniting fuel. Oxygen in the airflow is routed through the annular region to cool the engine. Fuel and hydraulic fluids are supplied to the engine in lines that can leak and provide an ignition source. In combat, military aircraft can be exposed to unfriendly fire that can sever fuel or hydraulic lines leading to ignition of the fuel.

Therefore, most commercial and military aircraft utilize an on-board engine nacelle fire detection and extinguishing/suppression system.

Conventionally, when a fire occurs in the engine nacelle, the pilot performs two tasks to save the aircraft; (1) fuel is shut off to the engine and (2) an on-board fire extinguisher is activated discharging an agent into the engine nacelle. In some aircraft, the fuel is automatically shut off to the engine in question when the extinguisher is discharged. Generally speaking, several seconds are required to de-pressurize or bleed the fuel lines.

After the nacelle fire is extinguished, re-ignition must be prevented. Preventing an extinguished fire from re-igniting is called suppression. If the re-ignition source is a component operating at an elevated temperature, the suppression time is dependent on how long it takes to bleed the fuel out of the lines. If the re-ignition source is a surface heated by the fire, then the suppression time is dependent on the time it takes the air flow to cool the surface below the ignition temperature. In either instance, generally from about 6 to 7 seconds are required to inert a fire, extinguish and suppress. Therefore, the inerting agent must be able to extinguish the fire and keep it out for a predetermined time, which is typically aircraft specific.

When used as an inerting agent, Halon 1301 is discharged from a pressurized bottle. The bottle containing the Halon 1301 is supercharged with nitrogen to a predetermined pressure. When activated, the agent is discharged by a blowdown mode and routed to the nacelle via tubing. It is necessary to maintain a minimum concentration of 3.3%, by volume, of Halon 1301 over the entire time, extinguish and suppress, to prevent re-ignition of the fire. To compensate for the dissipation of inerting agent, in a conventional fire extinguisher, the initial concentration of inerting agent is significantly higher than 3.3% to insure an effective concentration will be available for suppression. This excess volume of inerting agent is not required to fight the fire and represents a significant penalty as to cost, weight and environmental impact.

There remains, therefore, a need for a system to economically inert a fire that does not suffer from the disadvantages of the prior art.

SUMMARY OF THE INVENTION

Accordingly, it is an object of the invention to provide a method to efficiently inert a fire. It is a feature of the invention that an inerting media is delivered in two stages. In a first stage, a mass flow rate effective to extinguish the fire is employed. In a second stage, the inerting medium is delivered at a different mass flow rate that is effective to suppress the fire.

Among the advantages of the method of the invention are that a minimum quantity of inerting media for a given fire situation is employed. This reduces the cost and the weight of the fire suppression system and, in the instance of halons and other environmentally destructive media, reduces the environmental impact. Another advantage of the invention is that the dual stage process is amenable to many types of fire suppression systems and requires minimal retrofitting of existing equipment.

In accordance with the invention, there is provided a method to inert a fire. The method includes delivering a first inerting agent to the fire second inerting agent is delivered to location of the extinguished fire at a second mass flow rate for a time effective to prevent re-ignition.

The above stated objects, features and advantages will become more apparent from the specification and drawings that follow.

DETAILED DESCRIPTION

Figure 1:
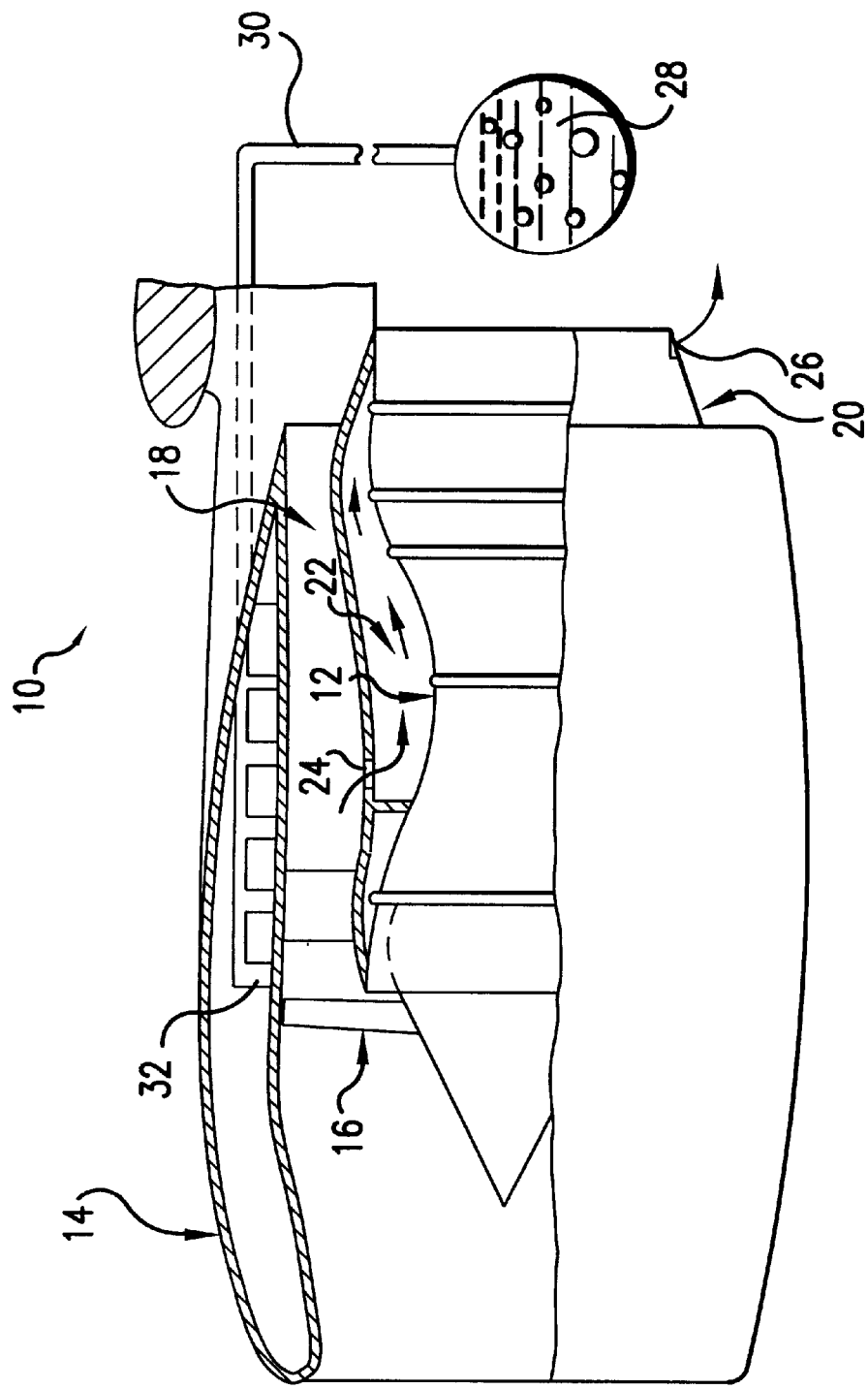
FIG. 1 illustrates in partial breakaway view, an aircraft engine containing a fire suppression system.

FIG. 1 illustrates an aircraft engine 10 including a core engine 12 supported by a fan nacelle 14 as illustrated in U.S. Pat. No. 5,239,817 to Mildenstein et al. The aircraft engine 10 is a fan jet type and includes rotating fan blades 16. A fan discharge 18 is in annular passageway extending between an inner surface of the nacelle 14 and an outer surface of the core engine nacelle 20. A core compartment 22 is defined as the space between the inner surface of the core engine nacelle 20 and the outer surface of the core engine 12. An inlet 24 introduces cooling air through the engine compartment that exits through an outlet 26.

The engine 10 operates at elevated temperature and has a ready supply of oxygen, through the cooling air. Therefore, if jet fuel or hydraulic liquids are discharged between the nacelle and the engine, a fire is a definite possibility. To extinguish the fire, an inerting agent 28 housed remotely from the engine 10 is delivered to the engine through conduit 30. Usually, conduit 30 ends at a plurality of discharge ports 32 disposed axially and radially around the core engine 12.

Figure 2:
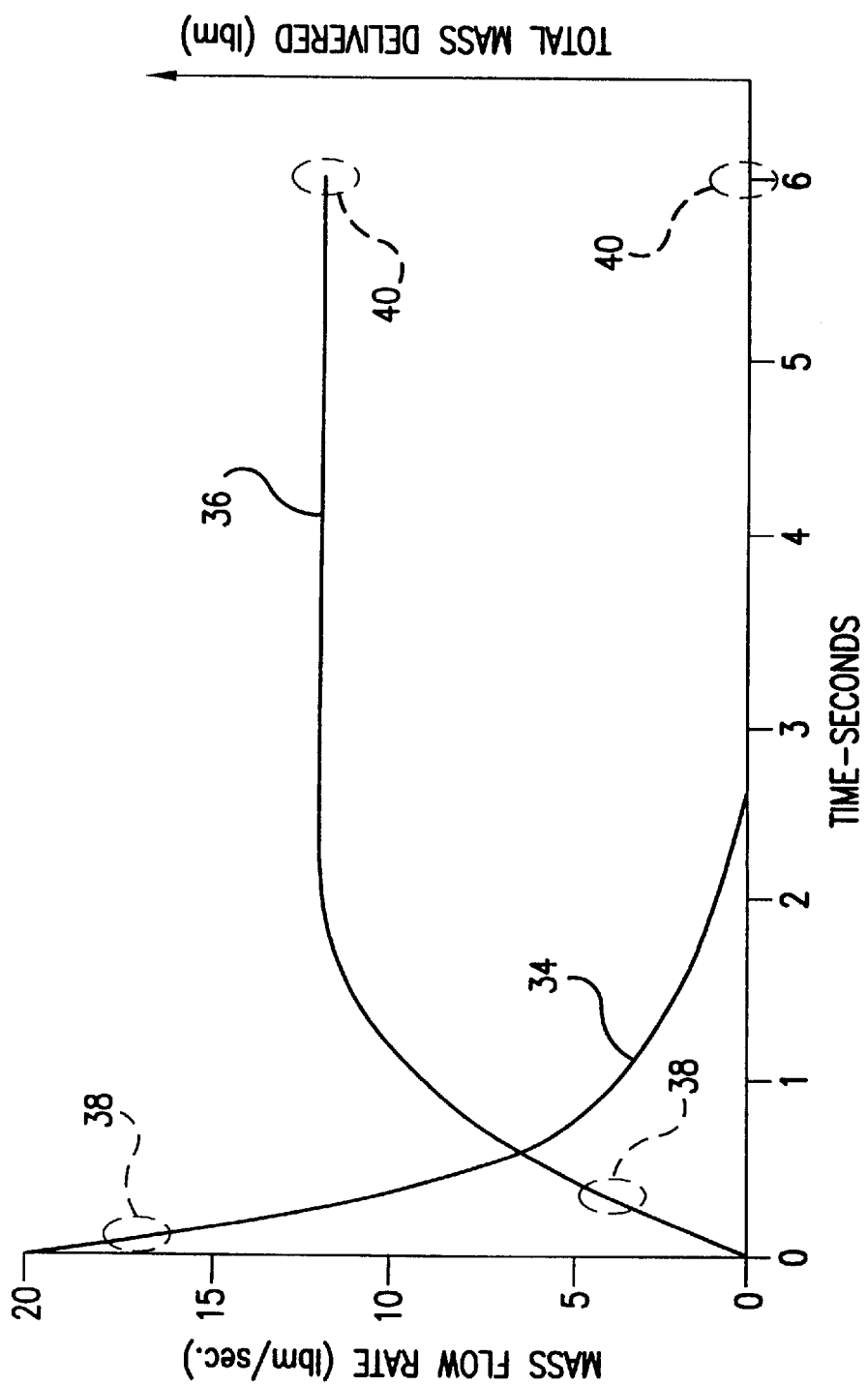
FIG. 2 graphically illustrates the mass flow rate of Halon 1301 as a function of time when utilized according to prior art methods.
Figure 3:
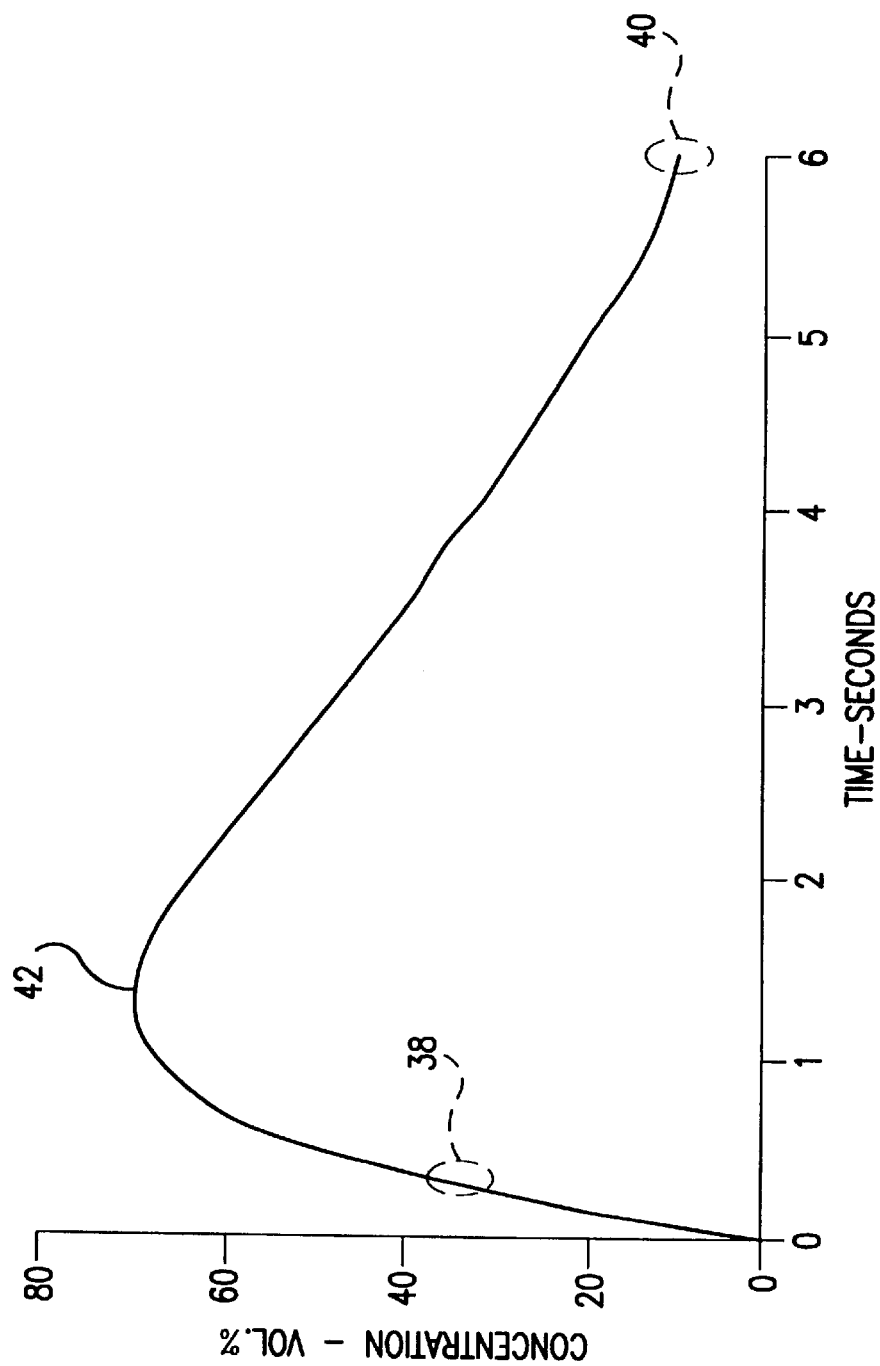
FIG. 3 graphically illustrates the concentration, in volume percent, of Halon 1301 when utilized according to the method of the prior art.

FIGS. 2 and 3 graphically illustrate discharge characteristics typical for a pressurized liquid inerting agent, such as Halon 1301. Reference line 34 is the agent mass flow rate and illustrates the delivery rate of the inerting agent in pounds-mass per second. Reference line 36 illustrates the total amount of inerting agent delivered to the fire in pounds. Region 38 identifies when the fire is extinguished and region 40 identifies when the fire is suppressed. The time between region 38 and region 40 identifies when the fire must be suppressed to prevent re-ignition.

FIG. 3 graphically illustrates the concentration, in volume percent, of inerting agent. A minimum concentration of inerting agent, 3.3% by volume for Halon 1301, is required to suppress the fire up to region 40 and to prevent re-ignition. Since the inerting agent dissipates with time, a maximum concentration percent 42, well in excess of the minimum concentration required to extinguish the fire 38 is provided. This excess concentration, while necessary to insure suppression, is not required to inert the fire and may be eliminated by the method of the invention.

Figure 4:
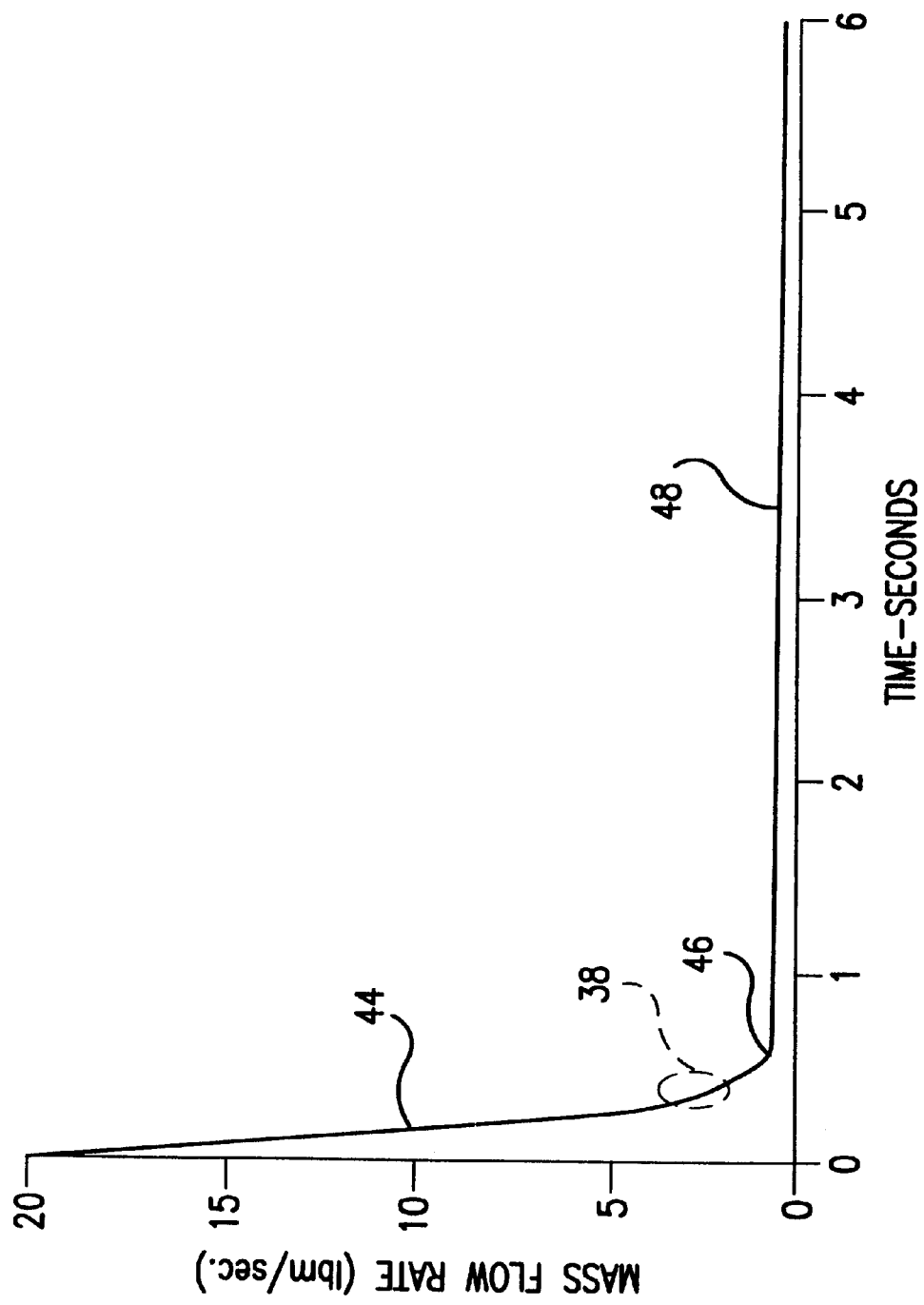
FIG. 4 illustrates the mass flow rate of an inerting medium in accordance with the invention.

FIG. 4 graphically illustrates the mass flow rate of an inerting agent for a dual stage fire extinguisher in accordance with the invention. In a first stage 44, the inerting agent is discharged at a first rate that is effective to extinguish a fire as indicated by region 38. Subsequent to extinguishing the fire, the mass flow rate undergoes a transition 46 to a second mass flow rate 48 that is sufficient to suppress the fire.

Figure 5:
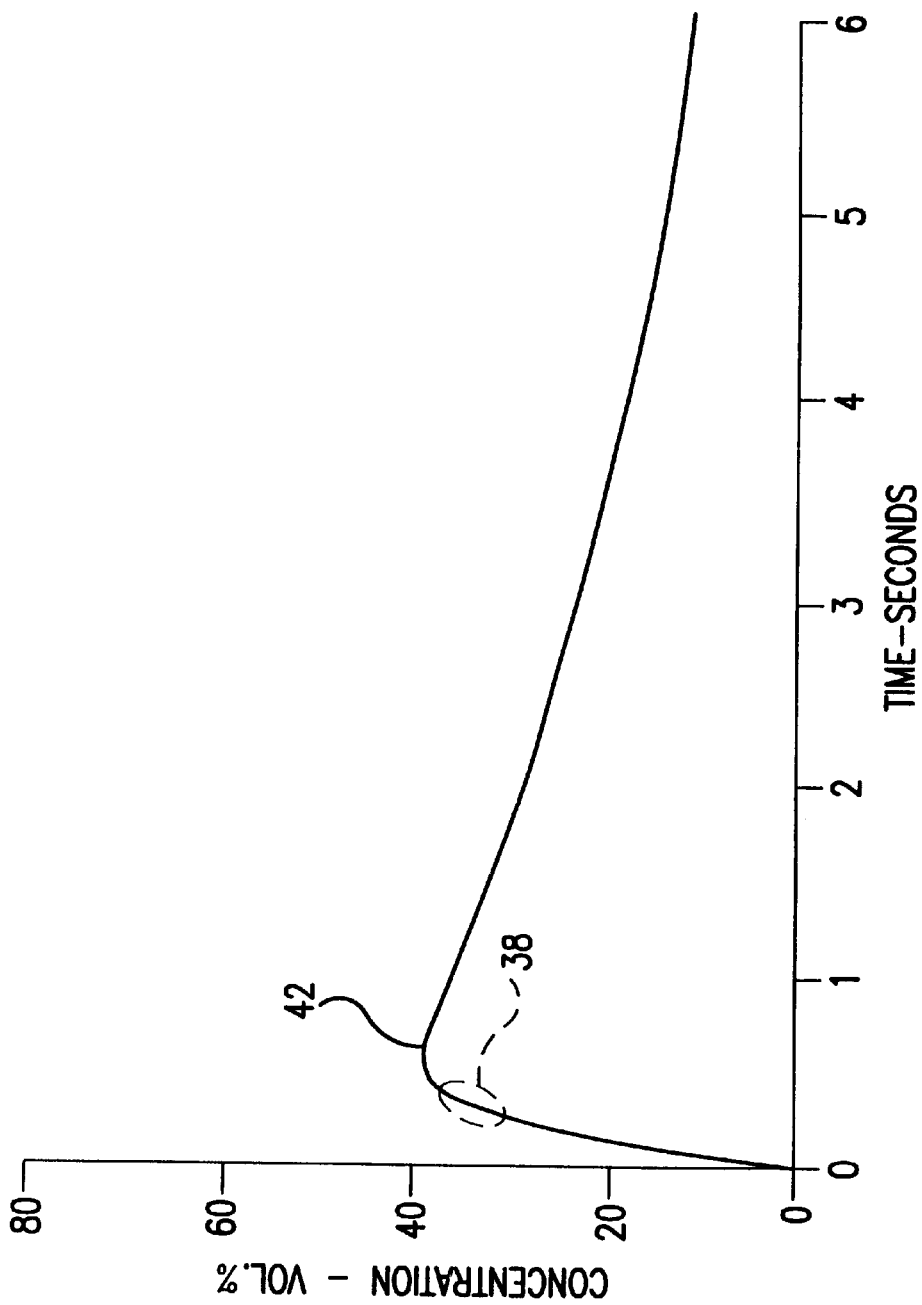
FIG. 5 illustrates the concentration, in volume percent, of the inerting medium in accordance with the method of the invention.

As illustrated in FIG. 5, the volume concentration achieves a maximum point 42 only slightly above the extinguishing region 38 and then remains sufficiently high to prevent the fire from re-igniting.

Figure 6:
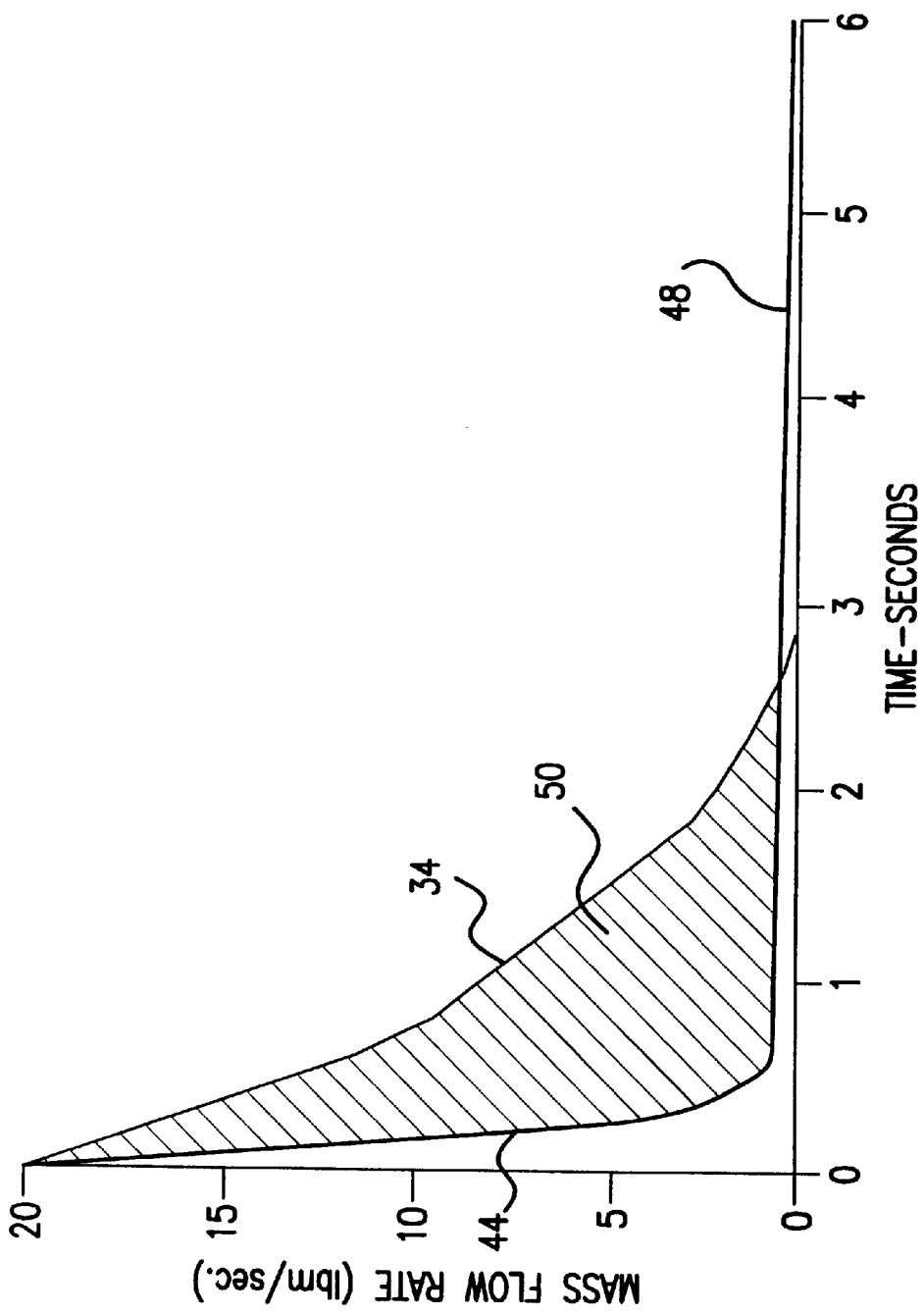
FIG. 6 illustrates the mass flow rate improvement achieved by the method of the invention.
Figure 7:
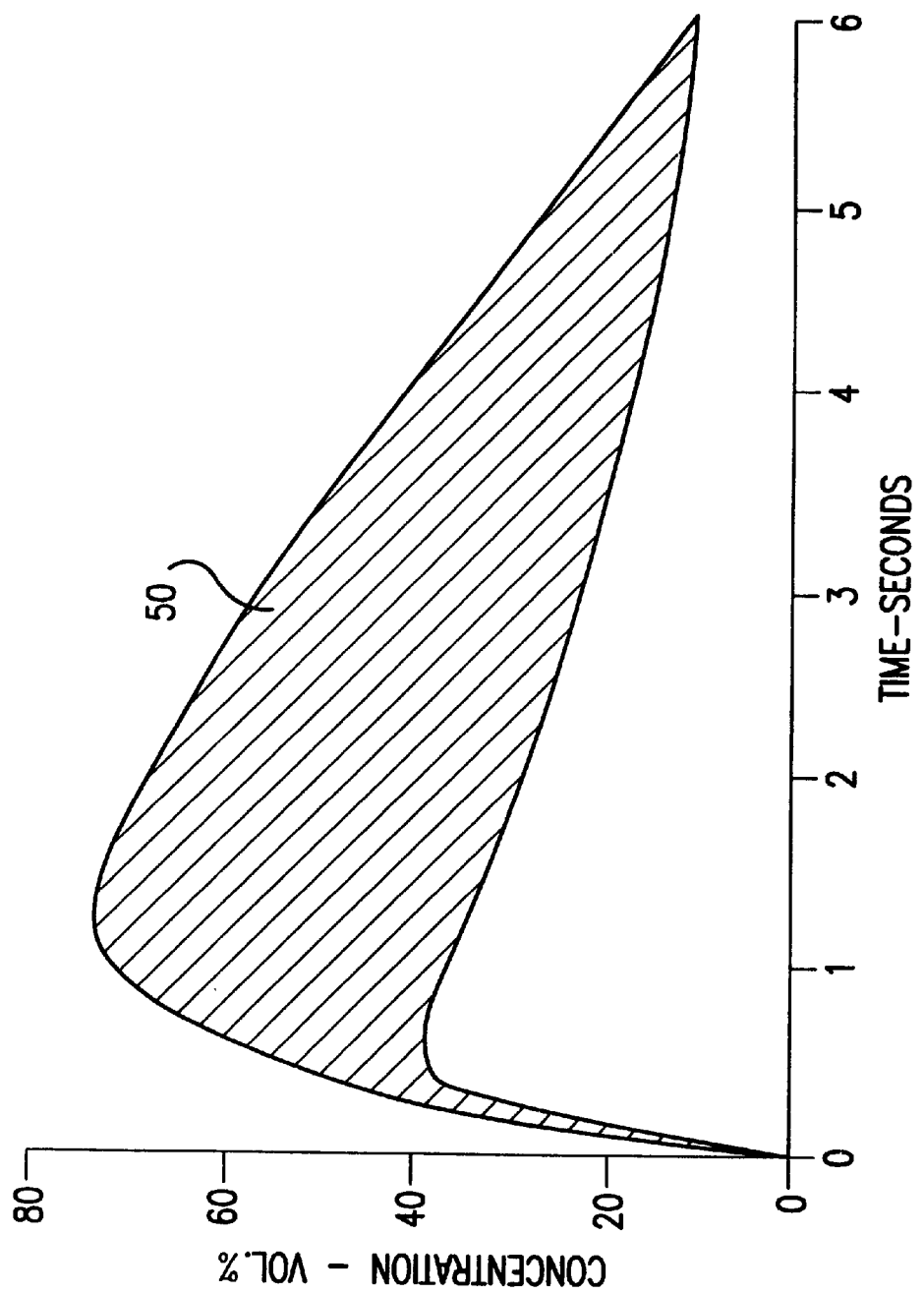
FIG. 7 illustrates the concentration in volume percentage improvement achieved by the method of the invention.

FIGS. 6 and 7 illustrate the savings by the dual stage process of the invention. In FIGS. 6 and 7, the mass flow rate and volume concentrations from a single stage fire extinguisher as known from the prior art is superimposed over the dual stage graphs of FIGS. 4 and 5. The cross-hatched region 50 represents a savings in the amount of inerting material required.

Figure 8:
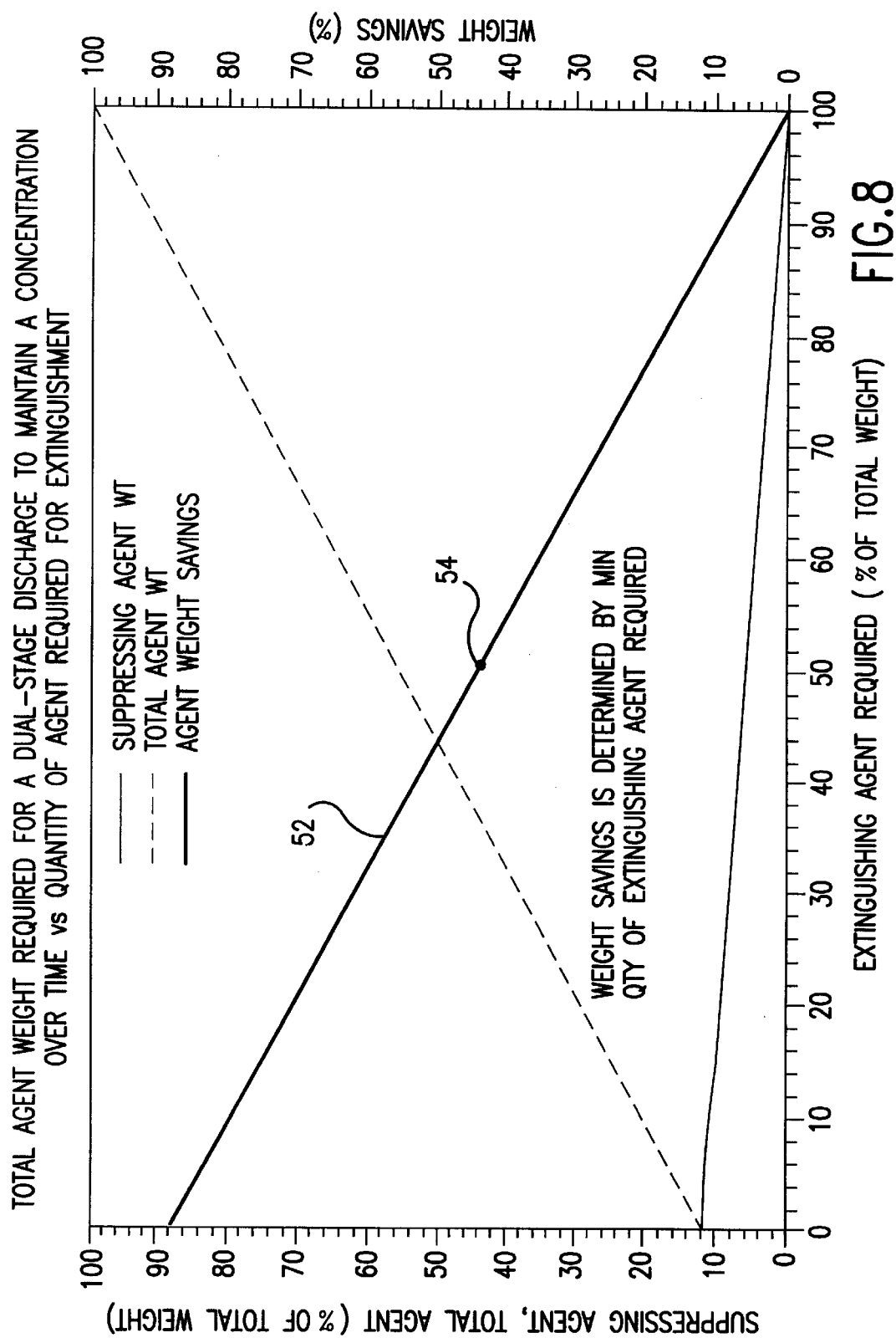
FIG. 8 illustrates the weight savings achieved by the method of the invention.

FIG. 8 further illustrates the potential inerting agent weight savings using a dual stage extinguisher system. Dependent on the type fire and the burning medium, the percentage of total inerting agent required as an extinguishing agent can be determined. A lesser quantity of suppressing agent then constitutes the balance of the inerting agent weight. By extending a line from the "extinguishing agent required" axis to the agent weight savings 52 and then extending the line horizontally to the axis labeled "weight savings," the savings can be calculated.

As an example, if 50% of the weight of the inerting agent in a single stage extinguisher is required for extinguishing, in the dual stage extinguisher, only an additional 6% is required for suppression enabling, as illustrated at reference point 54, a weight savings of 44%.

The dual stage system of the invention is applicable to a pressurized halon system as illustrated in FIG. 1. The system reduces the total amount of halon required, lessening the environmental impact and extending the availability of halon for aircraft fire systems and other applications.

Figure 9:
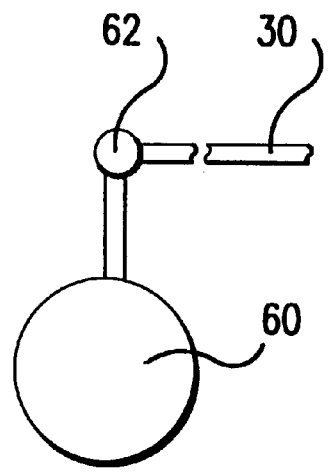
FIGS. 9–12 illustrate systems to deliver an inerting agent in accordance with the method of the invention.

The increased efficiency of the dual stage system of the invention, facilitates the use of other fire inerting agents, that while less effective than halon, are safer for the environment. The inerting agent 28 may be replaced with other agents such as HFC-227 ($CF_3CHFCH_3$), HFC-125 ($CF_3CF_2H$), HFC-236, nitrogen or carbon dioxide. As illustrated in FIG. 9, a single pressurized cylinder 60 has a flow rate regulator 62 to provide the proper mass flow rate of inerting gas to the fire for both extinguishing and suppression.

Figure 10:
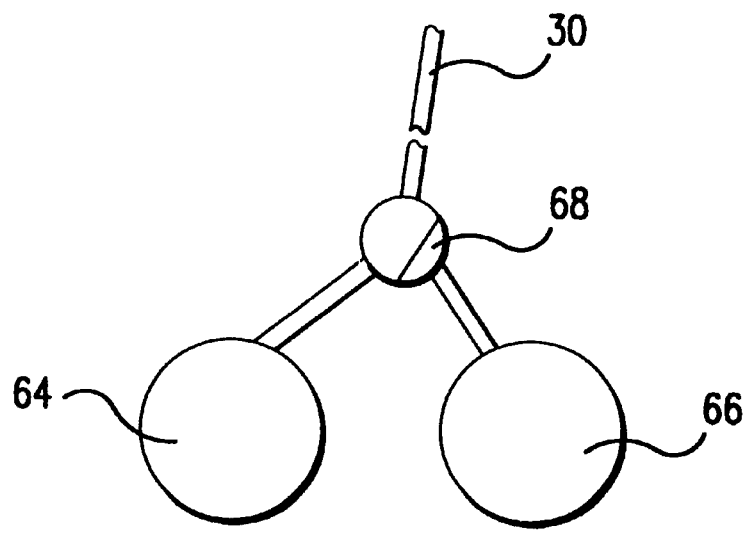

Alternatively, as shown in FIG. 10, the inerting agent is stored in a first vessel 64 in a volume and conduit system effective to provide a sufficient mass flow rate and gas concentration to extinguish the fire. A second vessel 66 contains either the same inerting agent or a different inerting agent in an amount and with conduit of a sufficient flow rate to provide effective inerting agent to suppress the fire. A baffle 68 controls the flow of the inerting agents to the conduit 30.

Figure 11:
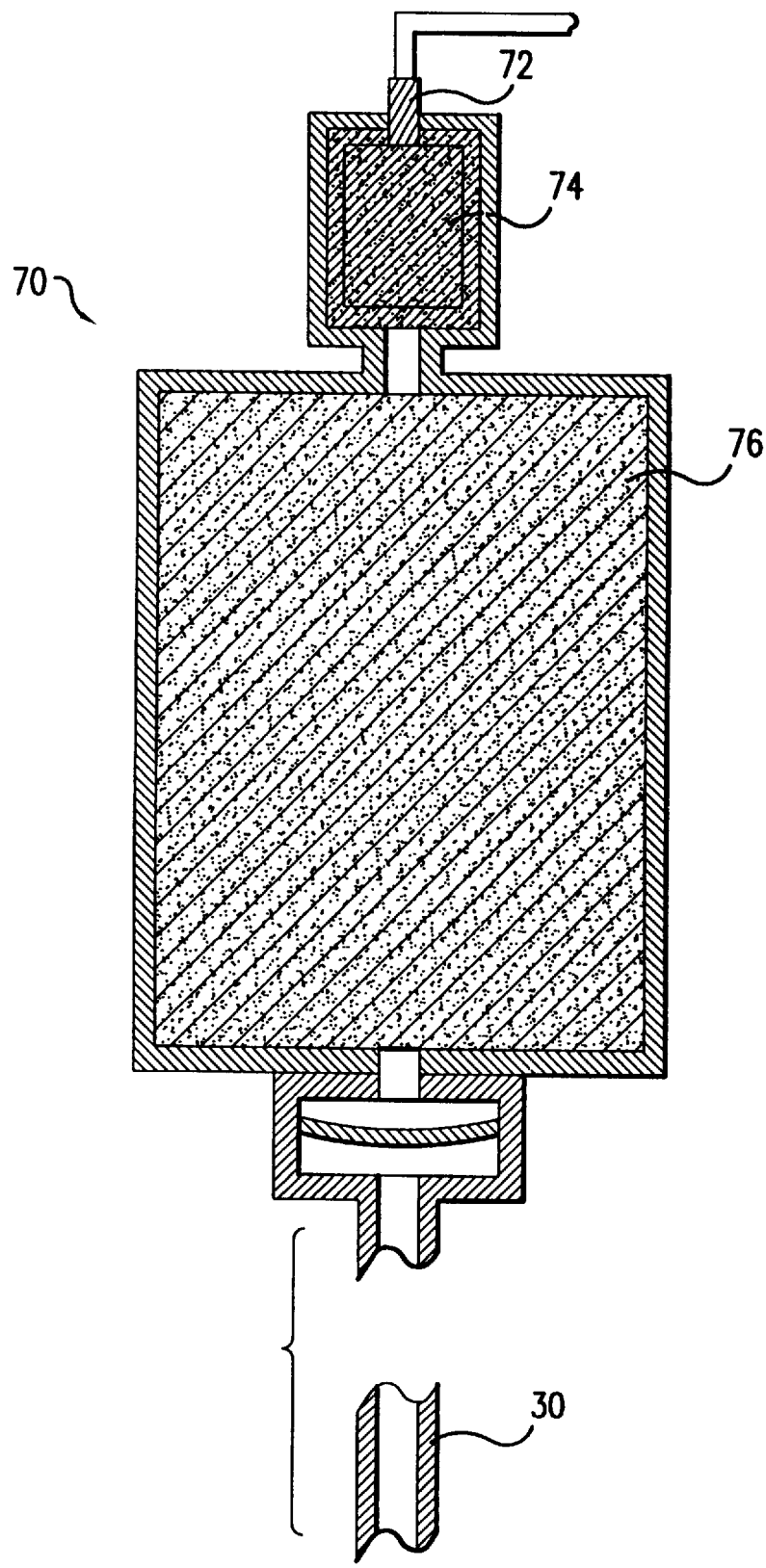

Fire suppressing gas generators, as known from U.S. Pat. No. 5,613,562 to Galbraith et al., that is incorporated by reference in its entirety herein, may also be utilized. As illustrated in FIG. 11, in the gas generator system 70, a squib 70 ignites a gas generating chemical mixture 74 that is either, then expelled onto the fire or, directed against a fire extinguishing powder 76 expelling the powder. Suitable fire extinguishing powders include magnesium carbonate, potassium bicarbonate, sodium bicarbonate and ammonium phosphate.

Figure 12:
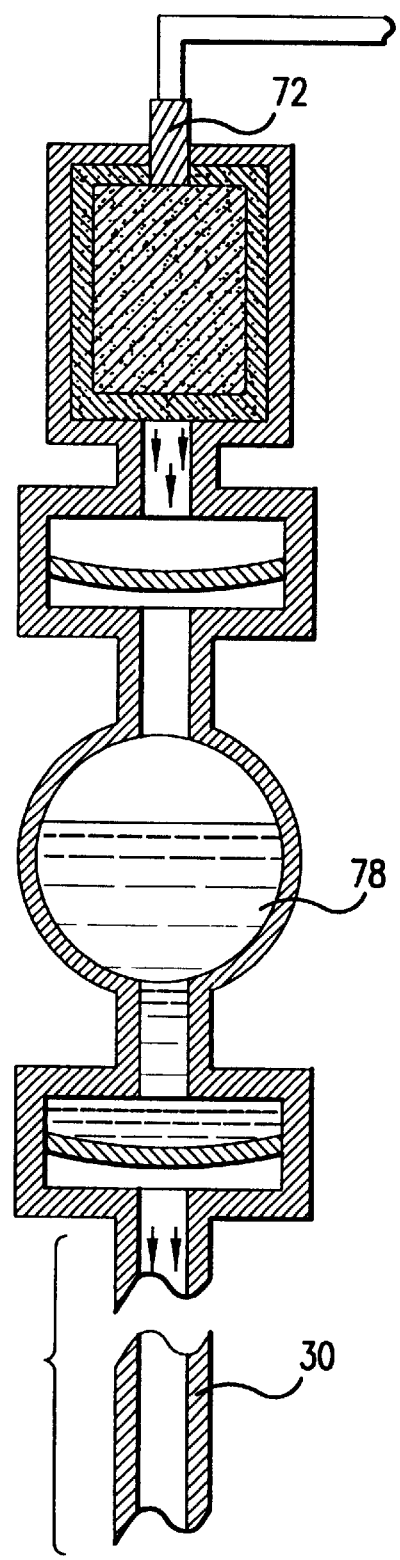

In yet another embodiment, as illustrated in FIG. 12, the gas generator delivers a gaseous stream to a fire inerting liquid 78 that is preferably a vaporizable liquid including fluorocarbons, molecules containing only a carbon-fluorine bond, and hydrogenated fluorocarbons. Molecules containing both carbon-hydrogen and carbon-fluorine bonds.

While the dual stage fire extinguisher of the invention has been described in terms of an engine nacelle, it is equally effective to extinguish a fire in other confined areas such as cargo dry bays, personnel compartments of tanks, ship holds and space craft.

It is apparent that there has been provided in accordance with this invention a method for suppressing a fire that fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A method for inerting a fire in a confined area, comprising the steps of:
   a) delivering a first inerting agent to said area at a first mass flow rate for a time effective to extinguish said fire; and
   b) delivering a second inerting agent to said area at a second mass flow rate, less than one fifth of the first mass flow rate, for a time effective to maintain an inerting agent concentration within the area to prevent re-ignition of said fire.

2. The method as claimed in claim 1 further comprising:
   storing said first and second inerting agents in a pressurized cylinder wherein said pressurized cylinder is coupled to a flow regulator for providing the first and second mass flow rates of said first and second inerting agents.

3. The method as claimed in claim 1 further comprising:
   storing said first inserting agent in a first vessel; and
   storing said second inerting agent in a second vessel.

4. The method as claimed in claim 1 wherein said first and second inerting agents are selected from the group consisting of:
   nitrogen, carbon dioxide and hydrofluorocarbons.

5. The method as claimed in claim 1 further comprising:
   providing a gas generating chemical mixture for creating a gaseous stream.

6. The method as claimed in claim 5 further comprising:
   providing a fire extinguishing material for delivery at said fire.

7. The method as claimed in claim 6 wherein the fire extinguishing material is selected from the group consisting of:
   magnesium carbonate, potassium bicarbonate, sodium bicarbonate and ammonium phosphate.

8. The method as claimed in claim 6 further comprising:
   providing an inerting liquid that is combined with said gaseous stream for delivery at said fire.

9. The method as claimed in claim 8 wherein said inerting liquid is selected from the group consisting of:
   fluorocarbons, molecules containing only one carbon-fluorine bond and hydrogenated fluorocarbons.

10. A method for inerting a fire in a confined area, comprising the steps of:
    storing a first inerting agent in a first vessel;
    storing a second inerting agent in a second vessel;
    providing a common discharge conduit for the first and second vessels;
    delivering the first inerting agent to said area through the common discharge conduit at a first mass flow rate for a time effective to extinguish said fire; and
    delivering a second inerting agent to said area through the common discharge conduit at a second mass flow rate, substantially less than the first mass flow rate, for a time effective to maintain an inerting agent concentration within the area to prevent re-ignition of said fire.

11. The method as claimed in claim 10 wherein said first inerting agent is the same chemical compound as said second inerting agent.

12. The method as claimed in claim 10 wherein said first inerting agent is a different chemical compound than said second inerting agent.

13. With fire extinguishing/suppressing system for delivering inerting agent from a storage location to a fire location in a confined area, a method for rebuilding the system from original to rebuilt conditions comprising the steps of:
    removing a single first vessel containing or previously containing a first inerting agent from the storage location, which first agent is or was Halon 1301;
    thereafter installing in the storage location at least a second vessel containing at least a second inerting agent, which second inerting agent is an HFC which is a less effective inerting agent than Halon 1301, wherein, relative to the original condition, the system in the rebuilt condition discharges inerting agent so as to maintain a concentration of inerting agent in the area effective to prevent fire re-ignition for at least as long, while providing a substantially lower peak concentration of inerting agent in the area.

14. The method as claimed in claim 13 wherein the effective amount of inerting agent in the original condition is larger than an effective amount of inerting agent in the rebuilt condition.

15. The method as claimed in claim 13 wherein in the rebuilt system the at least a second inerting agent comprises a liquid and a gas and the liquid is delivered first for suppressing the fire and the gas is then delivered for preventing re-ignition of the fire.

* * * * *